June 13, 1944. D. J. EVANS 2,351,113
WATER PURIFICATION APPARATUS
Filed Nov. 3, 1941 2 Sheets-Sheet 1
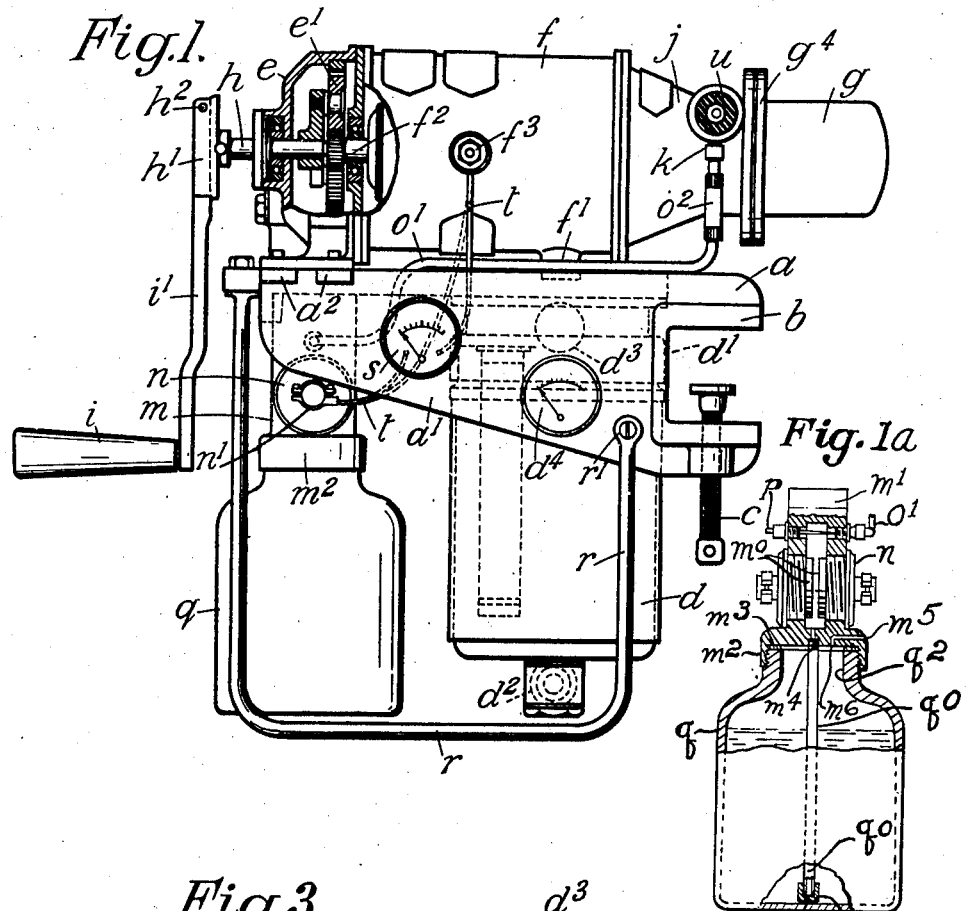
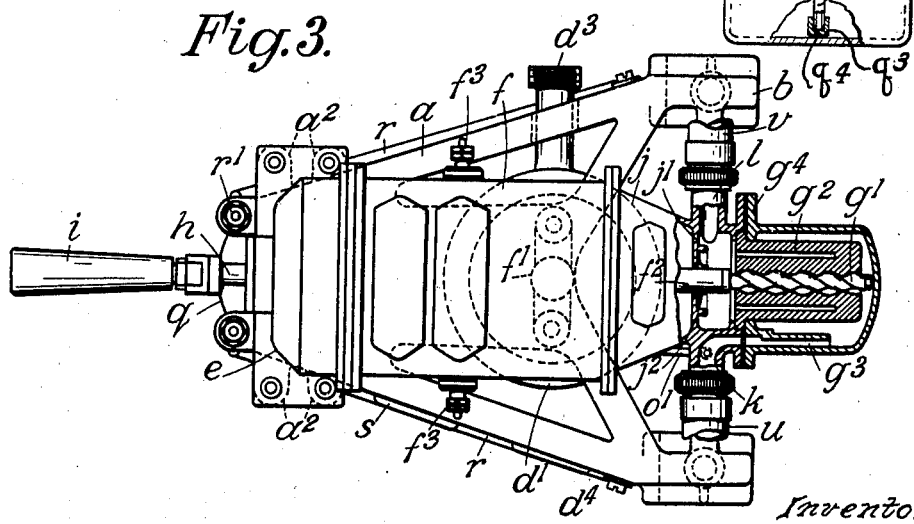
Inventor
DAVID JOHNSON EVANS

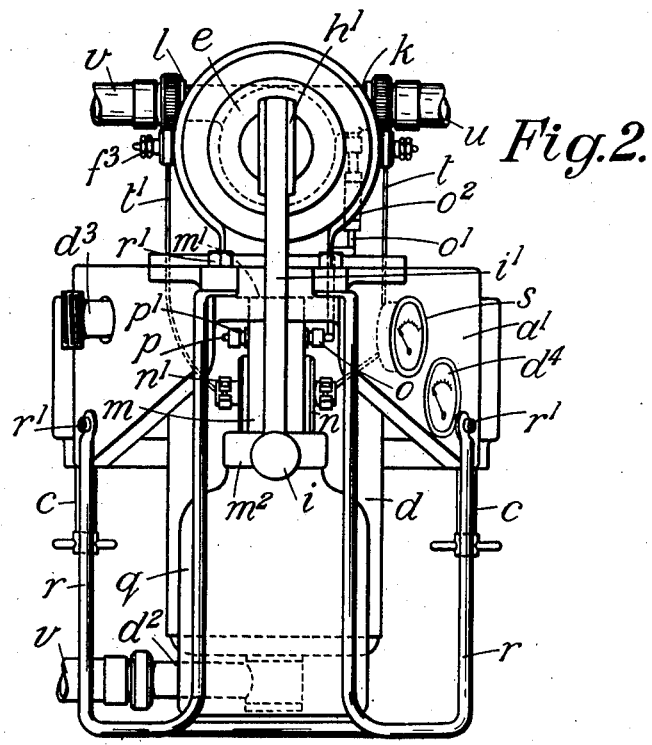
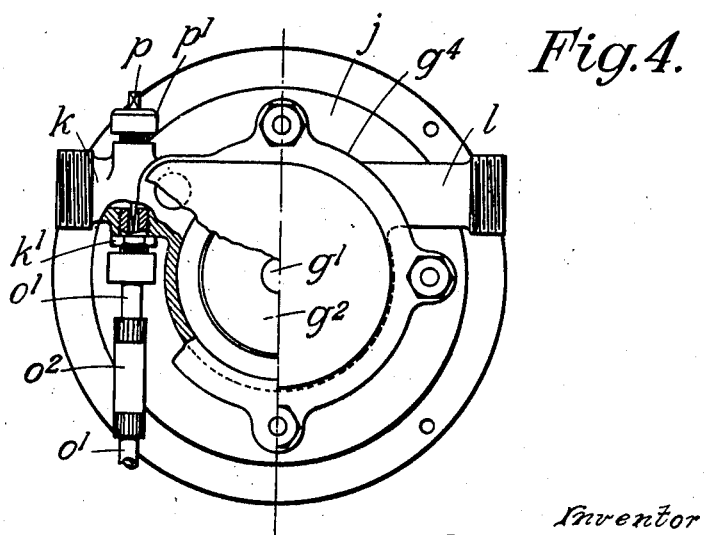

Patented June 13, 1944

2,351,113

UNITED STATES PATENT OFFICE 2,351,113

WATER PURIFICATION APPARATUS

David Johnson Evans, Tonbridge, England, assignor to E. C. D. Limited, Tonbridge, Kent, England Application November 3, 1941, Serial No. 417,714
In Great Britain December 20, 1940

7 Claims. (Cl. 210—29)

This invention relates to apparatus for the purification of water by treatment with electrolytic hypochlorite or the like.

The invention has for its main object to provide an improved portable and self-contained unit or apparatus suitable for the treatment of water in relatively small quantity, as for example in connection with a water-cart for a military unit in the field.

Another object of the invention is to provide an electrolytic purification unit or apparatus having manual driving means combined with a suitable multiplying gear for driving the electric generator at relatively high speed.

Other objects and advantages of the invention will hereinafter appear from the subsequent description given with reference to the accompanying drawings, in which:

Fig. 1 is a part sectional elevation of a preferred embodiment of the invention.

Fig. 1a is a detail thereof in part section.

Fig. 2 is an end view, as seen from the left of Fig. 1.

Fig. 3 is a part-sectional plan of Fig. 1.

Fig. 4 is an end view of the pump, on a larger scale, as seen from the right of Fig. 1, showing in part section an alternative position of the flow regulator.

Referring to Figs. 1 to 3, the apparatus illustrated includes a trapezoidal cast-metal framework $a$ of channel section having two parallel brackets $b$ projecting from the more widely spaced ends of the side flanges $a^1$, these brackets being formed with open jaws provided with screw clamps $c$ by which the apparatus may be fastened upon a table-edge, bench or like support. The horizontal web of the framework receives the vertical fixing screws of a filter $d$ carried beneath the framework, the screws engaging in the head $d^1$ of the filter; this filter may be of the pressure type, employing a bed of charcoal and/or diatomaceous earth, such as kieselguhr, being provided with a filling spout or made detachable from its head $d^1$ for the addition of filter bed material, for example in the form of a thin cream. An inlet pipe $d^2$ is connected to the bottom of the filter and an outlet pipe $d^3$ to the head $d^1$, a pressure gauge $d^4$ in connection with the inlet side being mounted on one of the flanges $a^1$ of the framework.

At the narrow end of the channel-section framework $a$, and in the plane of the web, there are provided flat facings or lugs $a^2$ on which a combined pump and generator unit is secured by vertical bolts engaging the base flange of a bell-shaped casing $e$ to which the front flange of the generator housing or stator $f$ is connected; the latter is also provided with a boss $f^1$ resting on the web of the framework, while the pump $g$ is bolted to and overhung beyond the rear flange of the generator housing.

The driving shaft $h$, mounted in line with the generator spindle $f^2$, is supported by the casing $e$, which forms a gear box through which the rotary movement imparted to the handle $i$ and driving shaft $h$ can be multiplied to produce higher speed of the generator, the spindle $f^2$ being keyed to the driven member of the planetary gearing $e^1$. The generator may conveniently be of a standard type similar to those employed on motor cycles, and provided with an enclosed cutout of centrifugal or other type, the generator operating at a nominal voltage of 6 volts and with a current output of 1 ampere, for example, to suit the size of electrolytic cell employed; its housing $f$ is provided with two diametrically opposite terminals $f^3$ for the external circuit.

The pump $g$ is preferably of the positive rotary type, comprising a helical rotor $g^1$ and an internally grooved flexible stator $g^2$ mounted inside a casing provided with a lateral passage $g^3$ leading to the suction end of the rotor; the flange $g^4$ of the casing is bolted to the adjacent flange of a conical shell $j$, the other end of which is bolted to the rear flange of the generator housing $f$. The shell $j$ has an internal web $j^1$ supporting a stuffing box or packing member $j^2$ through which the generator spindle $f^2$ passes to engage the pump rotor $g^1$; upon opposite sides of the shell $j$, there are provided inlet and delivery pipes $k$, $l$, the former being in communication with the suction passage $g^3$, while the other pipe opens into the space between the stator $g^2$ and the web $j^1$ so as to receive the delivery from the rotor $g^1$.

The electrolytic cell $m$ is mounted on the underside of the framework $a$, approximately beneath the casing or gearbox $e$; the cell comprises an ebonite or like body provided with a horizontal flange $m^1$ at the top, whereby it can be detachably fixed to the framework $a$. The middle portion of the body accommodates two circular graphite electrodes $m^0$ carried in ebonite plugs $n$ having external connections $n^1$ for the current from the generator; these plugs are screwed into the body in such a manner that the faces of the enclosed electrodes are exactly opposite, leaving between them a gap of predetermined width for the passage of the brine. Above these plugs, but below the fixing flange $m^1$, the cell body is provided with an outlet port $o$ connected with the passage leading up from the gap; from this port a small pipe $o^1$ is led to the suction side of the pump, a sight glass $o^2$ being accommodated in the line by means of rubber sleeves or the like, and the pipe $o^1$ connecting with a small nipple $k^1$ on the underside of the inlet pipe $k$. A flow regulator, consisting of an adjustable conically pointed screw $p$, may be arranged to control the junction of the outlet port $o$ with the gap-passage at the top of the cell, the screw entering through a stuffing box $p^1$ on the side opposite to the outlet port, as shown in Figs. 1a and 2; alternatively, as shown in Fig. 4, the flow regulator screw $p$ and its stuffing box $p^1$ may be arranged on the upper side of the pipe $k$ and in line with the nipple $k^1$.

The lower end of the cell body forms a circular base having a dependent rim or flange $m^2$ within which is fitted an annular rubber or like washer $m^3$, jointing upon the mouth of a brine container $q$ carried beneath the cell; in the center of the base, a port $m^4$ is provided, leading up to the gap between the electrodes, and a pipe $q^0$ fixed in this port in a suction tight manner passes down to the bottom of the brine container. The latter may consist for example of an ebonite tank with a circular mouth $q^2$ screwing into the rim $m^2$, as shown in Fig. 1a. The pipe $q^0$ is shown in Fig. 1a as fitted at its lower end with a detachable cap $q^3$ having a calibrated orifice $q^4$ to regulate the quantity of brine drawn up into the cell by the pump suction; any desired variation of the quantity of brine entering the cell may be obtained by fitting the pipe $q^0$ with a selected cap $q^3$ having an orifice $q^4$ of the required caliber. The flanged base of the cell body is provided with a radial hole $m^5$ connecting with a vent $m^6$ through the underside of the base to allow atmospheric pressure to pass into the brine container and thereby relieve the partial vacuum due to operation of the pump. The brine tank or bottle may be filled by preparing the solution of sodium chloride or common salt in situ, or supplies may be drawn from a neighboring source such as a larger military unit possessing suitable apparatus for preparing the salt solution of appropriate strength. In order to protect the brine tank or bottle, the frame $a$ may be provided with guards consisting of stout rods $r$ bent to U-shape and secured at their ends by screws such as $r^1$ to convenient points upon the framework; these guards may be utilized as legs to carry the apparatus when detached from its normal support.

An ammeter $s$ is shown mounted on one of the flanges $a^1$ of the framework, this instrument being connected in the lead $t$ between one of the generator terminals $f^3$ and the corresponding terminal $n^1$ of the electrolytic cell; the other pair of terminals $f^3$, $n^1$ on the opposite pole are shown connected directly together by a second lead $t^1$. The generator cut-out will be adjusted to close at a certain minimum speed for producing the required voltage; the current will then be maintained at the desired value (for example 1 ampere), which will be indicated on the ammeter $s$.

In operation, the pump $g$ draws water from any available source through a flexible hose or other pipe $u$ connected to the inlet pipe $k$ and at the same time the pump suction lifts the brine or salt solution from the container $q$ into the electrolytic cell $m$, in which it is subjected to the action of the current supplied by the generator, the electrolytic product commonly known as sodium hypochlorite travelling along the small pipe $o^1$ to the nipple $k^1$ on the inlet pipe $k$. The water, with added product, is forced under pressure by the pump through the delivery pipe $l$ and by way of a flexible hose or other pipe $v$ connected thereto into the filter inlet $d^2$, the purified water leaving the filter through the outlet $d^3$ which may be connected to a storage or settling tank.

When the apparatus is not in use, the handle $i$ can be folded over the generator and pump unit; for this purpose the shaft $h$ is shown fitted with a slotted driving member $h^1$ in which the crank $i^1$ of the handle $i$ is engaged, being held by means of a cross-pin $h^2$ acting as a hinge.

What I claim is:

1. Water purification apparatus, comprising a pump having a suction side and a delivery side, an electrolytic cell, an electric generator, means for supplying current to said cell from said generator, a chemical tank, manual driving means, operative connections between said driving means and said pump and generator, a connection from the suction side of said pump to a source of water supply, a branch pipe from said connection to said cell, a connection from said cell to said chemical tank, and means for regulating the flow through said branch pipe, said regulating means consisting of an adjustable needle-valve aligned with one end of said branch pipe.

2. Water purification apparatus, comprising a positive rotary pump, an electrolytic cell, an electric generator, means for supplying current to said cell from said generator, a chemical tank, manual driving means, operative connections between said driving means and said pump and generator, a framework supporting said pump, cell, generator, tank and driving means, said cell being supported on said framework at a higher level than said tank, means for connecting the suction side of said pump to a source of water supply, a branch pipe from said connecting means to an upper point of said cell, and a pipe connection from a lower point of said cell to said tank.

3. Water purification apparatus, comprising a positive rotary pump, an electrolytic cell, an electric generator, means for supplying current to said cell from said generator, a chemical tank, manual driving means, operative connections between said driving means and said pump and generator, a framework supporting said pump, cell, generator, tank and driving means, said framework being of channel section with a horizontal web and substantially vertical side flanges, said cell being supported beneath said web and between said side flanges, said tank being suspended below said cell, means for connecting the suction side of said pump to a source of water supply, a branch pipe from said connecting means to an upper point of said cell, and a pipe connection from a lower point of said cell to said tank.

4. Water purification apparatus, comprising a positive rotary pump, an electrolytic cell, an electric generator, means for supplying current to said cell from said generator, a chemical tank, manual driving means, operative connections between said driving means and said pump and generator, a framework supporting said pump, cell, generator, tank and driving means, said framework being of channel section with a horizontal web and substantially vertical side flanges, facings on the top and underside of said web, means for securing said pump and generator upon said facings on the top of said web, means for mounting said cell upon a facing on the underside of said web, means for connecting the suction side of said pump to a source of water supply, a branch pipe from said connecting means to an upper point of said cell, and a pipe connection from a lower point of said cell to said tank.

5. Water purification apparatus, comprising a positive rotary pump, an electrolytic cell, an electric generator, means for supplying current to said cell from said generator, a chemical tank, manual driving means, operative connections between said driving means and said pump and generator, a framework supporting said pump, cell, generator, tank and driving means, said framework being of channel section with a horizontal web and substantially vertical side flnages, means for mounting said cell and tank beneath said web, guards secured to said side flanges, said guards extending down to substantially even levels below said flanges to protect said tank and being adapted to form a base for the apparatus when standing upright, parallel brackets projecting from the ends of said side flanges, clamping means carried by said brackets for fastening the apparatus to a support, means for connecting the suction side of said pump to a source of water supply, a branch pipe from said connecting means to an upper point of said cell, and a pipe connection from a lower point of said cell to said tank.

6. Water purification apparatus, comprising a pump having a suction side and a delivery side, an electrolytic cell for the production of sodium hypochlorite, an electric generator, an electric circuit for supplying current to said cell from said generator, manual driving means, operative connections between said driving means and said pump and generator, a tank for sodium chloride solution, a framework supporting said pump, cell, generator, driving means and tank, said framework being of channel section with a horizontal web and substantially vertical side flanges, means for connecting the section side of said pump to a source of water supply, a branch pipe from said connecting means to an upper point of said cell, a pipe connection from a lower point of said cell to said tank, and an ammeter included in the electric circuit of said cell and generator, said ammeter being mounted upon said framework at a point visible to the operator of said manual driving means.

7. Water purification apparatus, comprising a positive rotary pump, an electrolytic cell, an electric generator, means for supplying current to said cell from said generator, a chemical tank, manual driving means, operative connections between said driving means and said pump and generator, said pump, generator, driving means and operative connections forming a unitary assembly, a framework supporting said assembly at a relatively high level and also supporting said cell and tank at intermediate and low levels respectively, means for connecting the suction side of said pump to a source of water supply, a branch pipe from said connecting means to an upper point of said cell, and a pipe connection from a lower point of said cell to said tank.

DAVID JOHNSON EVANS.